(12) United States Patent
Stanley

(10) Patent No.: US 6,741,483 B1
(45) Date of Patent: May 25, 2004

(54) CIRCULATING CURRENT SENSING DEVICE FOR AMPLIFIERS

(75) Inventor: Gerald R. Stanley, Osceola, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 58 days.

(21) Appl. No.: 10/303,504

(22) Filed: Nov. 25, 2002

Related U.S. Application Data

(63) Continuation-in-part of application No. 09/968,079, filed on Oct. 1, 2001, which is a continuation of application No. 09/329,759, filed on Jun. 10, 1999, now Pat. No. 6,297,975.
(60) Provisional application No. 60/100,602, filed on Sep. 16, 1998.

(51) Int. Cl.[7] .............................. H02M 7/00; H03F 1/02
(52) U.S. Cl. ................................ 363/65; 363/71; 330/9
(58) Field of Search ............................ 363/65, 67, 69, 363/71; 330/551, 69, 117, 9

(56) References Cited

U.S. PATENT DOCUMENTS

| | | | |
|---|---|---|---|
| 4,149,233 A | 4/1979 | Nagano | |
| 4,356,403 A | 10/1982 | Mohat | |
| 5,245,525 A | 9/1993 | Galloway et al. | |
| 5,317,498 A | 5/1994 | Dhyandchand et al. | |
| 5,446,645 A | 8/1995 | Shirahama et al. | |
| 5,566,060 A | 10/1996 | Shimer et al. | |
| 6,255,902 B1 * | 7/2001 | Gilliland et al. | ................ 330/9 |
| 6,297,975 B1 | 10/2001 | Stanley | |

OTHER PUBLICATIONS

Shiguo Luo, Z. Ye, R. Lin and Fred C. Lee, "A Classification and Evaluation of Paralleling Methods for Power Supply Modules," Virginia Power Electronics Center (no date).

* cited by examiner

*Primary Examiner*—Jessica Han
(74) *Attorney, Agent, or Firm*—Brinks Hofer Gilson & Lione

(57) ABSTRACT

A power amplifier system capable of operation with paralleled power amplifiers includes a circulating current sensing device. The circulating current sensing device decouples the outputs of the paralleled power amplifiers and passively minimizes unbalanced power output of the paralleled amplifiers. In addition, the circulating current sensing device provides the capability to measure circulating current. The measured circulating current may be used in a negative feedback circulating current control to actively minimize unbalanced power output of the paralleled power amplifiers.

41 Claims, 8 Drawing Sheets

CIRCULATING CURRENT SENSING DEVICE FOR AMPLIFIERS

PRIORITY CLAIM

This is a continuation-in-part of U.S. patent application Ser. No. 09/968,079, filed Oct. 1, 2001, which is a continuation of U.S. patent application Ser. No. 09/329,759, filed Jun. 10, 1999, now U.S. Pat. No. 6,297,975 issued on Oct. 2, 2001, and claims priority based upon U.S. Provisional Patent Application Serial No. 60/100,602 filed on Sep. 16, 1998 all of which are incorporated by reference.

BACKGROUND OF THE INVENTION

1. Technical Field

The invention is directed to a circulating current sensing device and more particularly to a circulating current sensing device for sensing circulating currents in power amplifiers.

2. Related Art

Paralleling of amplifiers (fast four quadrant DC to AC power converters) has been done for some time. More recently, however, amplifier designs are changing from linear to switch-mode technology. In addition, the environment in which amplifiers operate is continuing to demand larger amounts of power. When paralleled amplifiers do not share current, costly inefficiencies arise.

At first paralleling of amplifiers was done using simple passive ballasting. Linear amplifiers had wide bandwidth and fairly small phase errors that led to substantial conformity of gain and phase characteristics. High frequency circulating currents were reduced by using a highly coupled center tapped inductor whose center tap joined to the loads and whose ends attached to an amplifier output. If the amplifiers are delivering equal currents, such an inductor will store no net energy and thus no signal voltage will be lost to inductance. It is important not to loose signal voltage as the costs of generating large amounts of power are also large.

When the demands on the ballast resistors grew to more than 250 Watts of dissipation, negative current feedback was used to synthesize an effective amplifier output resistance (lossless). This constituted a second and improved generation of paralleling design.

With the advent of high efficiency switch-mode amplifiers additional issues have arisen. Output currents are typically larger and the gain and phase characteristics are now much looser in tolerance, potentially making current sharing more difficult.

One of the uses for the subject paralleled amplifiers is in the medical industry, for use with magnetic resonance imaging (MRI), where the load on the system is the gradient coil of the MRI device. This environment is relatively hostile for gradient signal processing, because the MRI device has large amounts of peak RF power (<=20KW) supplied to coils that are immediately inside the gradient coils. With such intimate coupling, it is necessary to place low-pass filters in the feed lines to the gradient coils to contain the RF currents. These filters tend to aggravate an already bad situation for establishing wide bandwidth negative current feedback. Large phase response lags within the amplifiers and distributed capacitances in the gradient coils already have limited the amount of feedback that can be used to control the system. Any controls added to effect current sharing cannot corrupt the output signal as there may be insufficient feedback to correct any significant injected non-linear errors. Therefore some of the methods practiced by the DC to DC converter industry for current sharing are not applicable here.

What is desired is a lossless mechanism for sensing circulating (unbalanced) currents caused by mismatched parallel power amplifiers and introduction of output corrections in such a manner as to not influence the net output available to the load. This implies that the entire methodology is lossless and also has no net output inductance added to the load circuit.

SUMMARY

The invention provides an amplifier system of two or more (N) parallel power amplifiers that use current sensors to directly measure the circulating currents and, by use of negative feedback, regulate the circulating current to zero. The amplifier system may use passive magnetic device(s) to facilitate current sharing, where the passive magnetic device(s) are each designed to store no magnetic energy when under balanced excitation.

A generalized method for balancing paralleled power amplifiers is disclosed wherein (N) power amplifiers, are paralleled and have current sensors positioned so as to form a differencing equation for the circulating current. The difference in circulating current may be used as feedback to the paralleled power amplifiers to force the circulating current to zero. The current sensors may be current transforming transducers, where (N-1) transducers are included in the system. The feedback from the (N-1) transducers is distributed to summing amplifiers. The summing amplifiers may balance the power amplifiers according to the gain distribution of the summing amplifiers. The amplifier system may also include passive magnetic device(s) to facilitate current sharing. The passive magnetic device(s) are generally inductors which are designed to store no magnetic energy when under balanced excitation.

A power amplifier system that includes two or more power amplifiers with outputs capable of being paralleled may also use a circulating current sensing device. The circulating current sensing device may include the functionality of both a current sensor(s) and a passive magnetic device(s) in one device to minimize unbalanced operation of the paralleled power amplifiers. The circulating current sensing device may include an inductive current transformer and a preamplifier.

The inductive current transformer may have a core that is a passive magnetic device capable of passive control to minimize unbalanced amplified output power from the paralleled power amplifiers. The core may include a slot with at least one sensor positioned in the slot. The sensor may sense magnetic flux resulting from the circulating current and provide signals indicative of circulating current to the preamplifier. The preamplifier may process the signals to provide a negative feedback signal that is an error correcting signal. The negative feedback signal may be used for active control of unbalanced amplified output power from the paralleled power amplifiers. Accordingly, unbalanced amplified output power of paralleled power amplifiers may be minimized by the combination of the active control and the passive control.

Sensing of the circulating currents may be performed by positioning the circulating current sensing device to measure the amplified output power from each of the power amplifiers. Alternatively, the circulating current sensing device may be positioned to directly measure the circulating current from positive and negative output stage power of a positive and negative output stage included in each of the power amplifiers.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
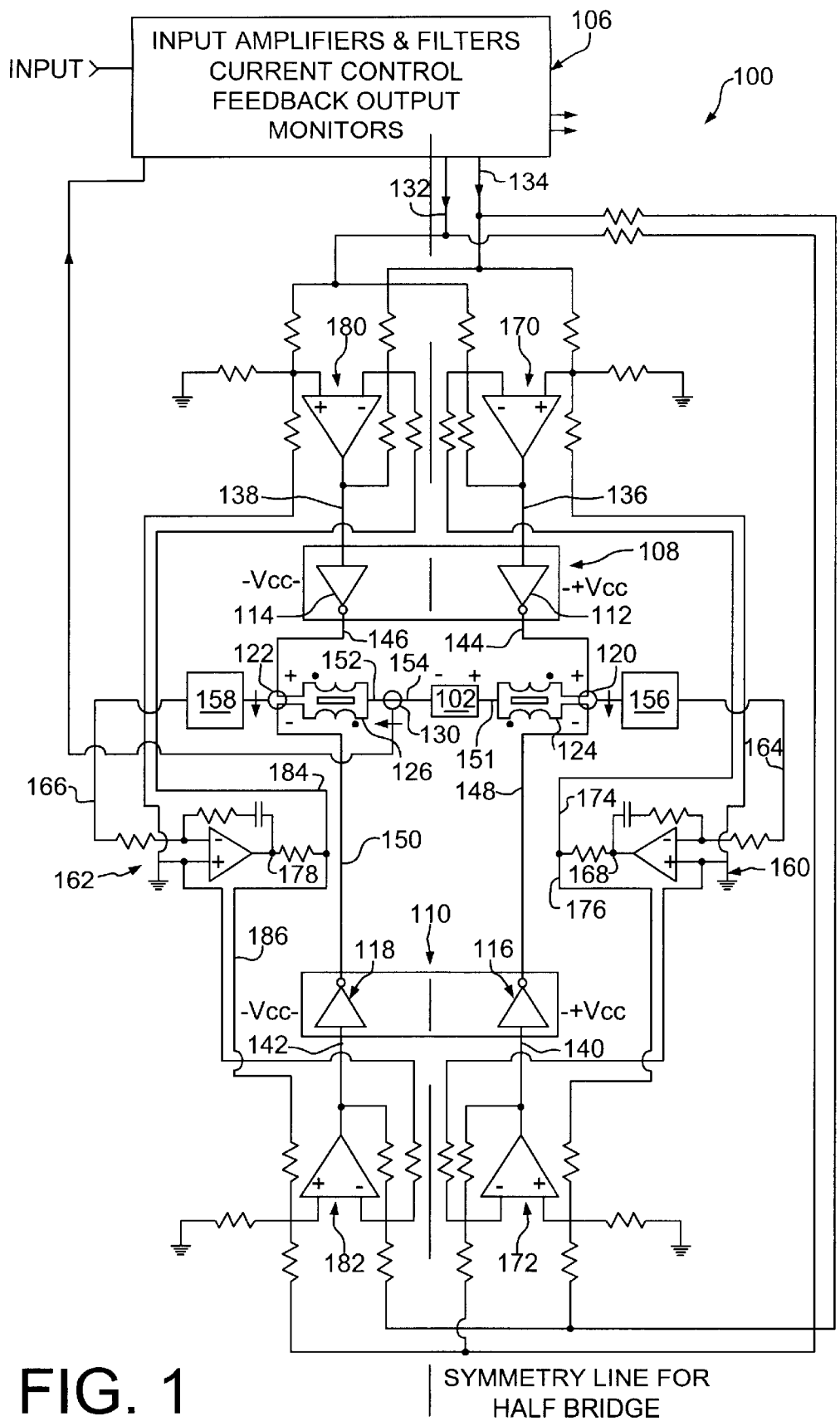
FIG. 1 is a schematic view of an example of 2 paralleled powers amplifiers in an amplifier system.

FIG. 1 illustrates an example of 2 paralleled power amplifiers within an amplifier system 100 that is generally used for the purpose of providing balanced output to a load 102, such as a gradient coil. The amplifier system 100 may further include an assembly of state of the art circuitry 106 that may include input amplifiers and filters, current control feedback and output monitors, and the like. The system 100 may also include first and second power modules 108 and 110 which comprise individual power amplifiers 112, 114 and 116 and 118 respectively. The amplifier system 100 further may include current sensing transducers 120 and 122 and passive devices 124 and 126 . A main current transducer 130 may be medially positioned between the load 102 and the passive device 126 providing a feedback loop to the state of the art circuitry 106.

FIG. 1 also illustrates an input signal that may be provided to the power modules 108 and 110 via buses 132 and 134 . The inputs to individual power amplifiers 112 and 114 are via buses 136 and 138 respectively. Similarly, the inputs to power amplifiers 116 and 118 may be provided via buses 140 and 142 respectively. The outputs of power amplifiers 112 and 114 are directed through respective current sensing transducers 120 and 122 via buses 144 and 146 respectively, while the outputs of power amplifiers 116 and 118 are directed through respective current sensing transducers 120 and 122 via buses 148 and 150, respectively. The busses 144 and 148 are connected to the passive device 124 to place power amplifiers 112 and 116 in parallel. The passive device 124 is connected to the load 102 by way of a bus 151. Likewise, the busses 146 and 150 are connected to the passive device 126 to place amplifiers 114 and 118 in parallel. The passive device 126 is connected to the main current transducer 130 by way of a bus 152, and then directly to the load 102 by way of a bus 154.

As also illustrated in FIG. 1, pre-amps 156 and 158 are connected to the respective transducers 120, 122. In addition, the pre-amps 156 and 158 are connected to amp circuits 160 and 162, by way of respective buses 164 and 166. The output at an output node 168 of amp circuit 160 may then be provided to summing amp circuits 170 and 172 via buses 174 and 176, respectively. The output at an output node 178 from amp 162 is similarly provided to summing amp circuits 180 and 182 via buses 184 and 186, respectively. One active control loop is closed when the outputs of the summing amp circuits 170 and 172 are provided to the respective power amplifiers 112 and 116 by respective buses 136 and 140. Similarly, the other active control loop is closed when the output of the summing amp circuits 180 and 182 are provided to the respective power amplifiers 114 and 118 by respective buses 138 and 142.

The amplifier system 100 may be used within any device utilizing switched mode amplifiers such as, the amplifier(s) within magnetic resonance imaging (MRI) devices, within audio devices, etc. Within an MRI application, a full bridge configuration may utilize multiple paralleled full bridge amplifiers such as the two full bridge amplifiers illustrated in the amplifier system 100 of FIG. 1. In other applications, other configurations may be utilized. For example, a half bridge configuration may be utilized in driving a poly-phase motor, a loudspeaker, etc.

FIG. 1 shows by way of a dashed line the symmetry for the half bridge configurations within each of the full bridge amplifiers. From each of the illustrated full bridge amplifiers, there are two balancing signals involved because there are two half bridge pairs coming together (one half bridge from each full bridge amplifier). In other words, one of the two half bridge pairs with output signals that are paralleled includes power amplifiers 112 and 116, the other half bridge pair includes power amplifiers 114 and 118.

When the two output signals of the power amplifiers 112 and 116 or power amplifiers 114 and 118 are not balanced, there will not be perfect gain coming to the load 102 and a circulating current will be formed. For example, circulating current generated by the power amplifiers 112 and 116 may flow around in a loop through the passive device 124. Transducer 120 may sense a difference current in buses 144 and 148. The transducer 120 is therefore represented with a positive mark and a negative mark in FIG. 1 to illustrate current passing through in opposite directions; so that twice the difference is actually sensed by a core of the transducer 120. The core may provide a dc coupled output signal which may be amplified by the error amplifier 156. The amplified output signal representative of the difference in output current may be integrated by the amp circuit 160 to represent an error correcting signal. The error correcting signal is a negative feedback signal that may be sent back to become part of the input signal to the power amplifiers 112 and 116 via the summing amp circuits 170 and 172. It should be appreciated that the identical course of action is true on the other half-bridge pair that includes power amplifiers 114 and 118. The transducer 122 may similarly sense the difference current through buses 146 and 150 and provide an error correcting signal as negative feedback to the summing amp circuits 180 and 182 via the error amplifier 158 and the amp circuit 162.

Two current sharing mechanisms are included in the amplifier system 100 of FIG. 1. The first mechanism provides a low pass structure that is a relatively low frequency active control system for controlling circulating current in paralleled power amplifiers. Active control by the low pass structure involves the current sensing balance transducers, 120 and 122 and associated circuitry as previously discussed. The second mechanism is a high pass structure that provides a relatively high frequency passive control system for controlling circulating current in paralleled power amplifiers. The high pass structure utilizes coupled magnetic devices that are the passive devices 124 and 126. The passive devices 124 and 126 may be used to provide an inductance at the output of the paralleled power amplifiers 112 and 116 or 114 and 118, without adding to the output inductance of power amplifiers 112 and 116 or 114 and 118. Passive control of the circulating current is performed as a function of the inductance of the passive devices 124 and 126. The sizing of the current transducers 120 and 122, and the passive devices 124 and 126 will now be described in greater detail.

Figure 2:
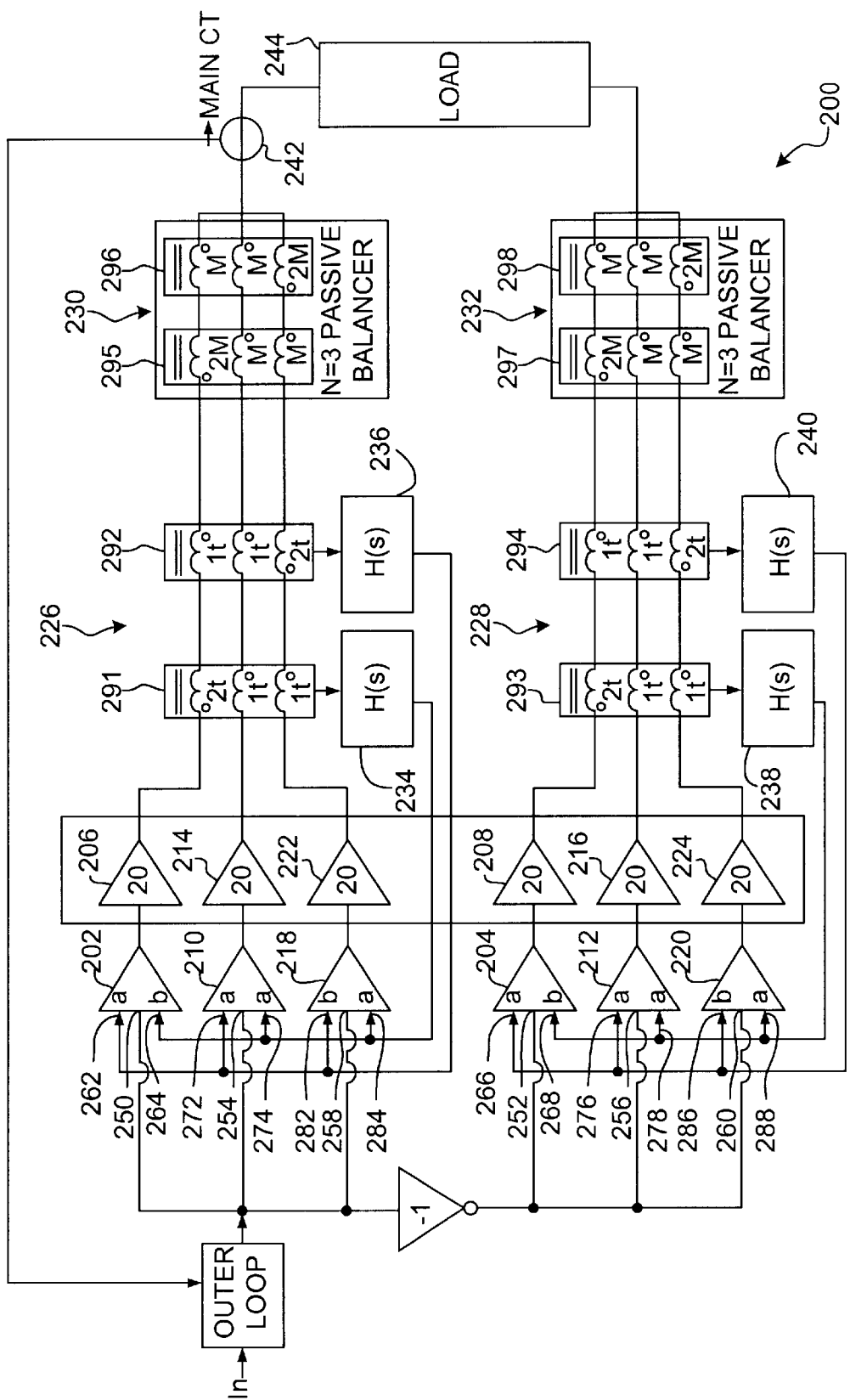
FIG. 2 is a schematic view of an example of 3 paralleled power amplifiers in an amplifier system.

FIG. 2 is a circuit schematic of three paralleled power amplifiers (N=3) within an amplifier system 200 that is similar to FIG. 1. In the illustrated example, two groups of three paralleled power amplifiers are part of three full bridge amplifier configurations, however, in other examples, any number of half bridge configurations, etc. may be utilized. In FIG. 2, a first full bridge configuration includes summing amplifiers 202 and 204 and a first power module that includes power amplifiers 206 and 208. A second full bridge configuration includes summing amplifiers 210 and 212 and a second power module that includes power amplifiers 214 and 216. Summing amplifiers 218 and 220 and a third power module that comprises power amplifiers 222 and 224 are included in a third full bridge configuration. As illustrated, the outputs of power amplifiers 206, 214 and 222 are paralleled and the outputs of power amplifiers 208, 216 and 224 are paralleled. The amplifier system 200 also includes current sensing transducers 226 and 228, passive devices 230 and 232 and pre-amplifiers 234, 236, 238 and 240. Further, the amplifier system 200 includes a main current transducer 242 and a load 244 similar to the main current transducer 130 and load 102 of FIG. 1.

Each of the summing amplifiers 202, 204, 210, 212, 218 and 220 are shown with three input ports. A main input port 250, 252, 254, 256, 258 and 260 of each of the summing amplifiers 202, 204, 210, 212, 218 and 220 is shown as the center input port. The coefficients of gain of the main input ports 250, 252, 254, 256, 258 and 260 may be approximately equal, and the value of coefficients may be immaterial. Each summing amplifier 202, 204, 210, 212, 218 and 220 may also have two outer ports.

Within the first full bridge configuration, summing amplifier 202 includes outer ports 262 and 264 and summing amplifier 204 includes outer ports 266 and 268. Summing amplifiers 210 and 212 of the second full bridge configuration similarly include respective outer ports 272 and 274 and outer ports 276 and 278. Within the third full bridge configuration summing amplifier 218 includes outer ports 282 and 284 and summing amplifier 220 includes outer ports 286 and 288. The outer ports 262, 264, 266, 268, 272, 274, 276, 278, 282, 284, 286 and 288 for each respective summing amplifier 202, 204, 210, 212, 218 and 220 receive balancing signals that are the previously discussed error correcting negative feedback signals. The outer ports 262, 264, 266, 268, 272, 274, 276, 278, 282, 284, 286 and 288 may be asymmetric as it relates to their gain coefficients. The gain coefficients of the outer ports 262, 264, 266, 268, 272, 274, 276, 278, 282, 284, 286 and 288 for each respective summing amplifier 202, 204, 210, 212, 218 and 220 are characterized by two gain coefficients, "a" and "b." The gain coefficients may be distributed within the summing amplifies 202, 204, 210, 212, 218 and 220 according to the following table:

| Gain Coefficients | Coefficient a | Coefficient b |
| --- | --- | --- |
| Amplifier Outer Ports | 262, 266, 272, 274, 276, 278, 284 and 288 | 264, 268, 282 and 286 |

The relationship between Gain Coefficients "a" and "b" in each summing amplifier 202, 204, 210, 212, 218 and 220, is:

$$a=-b/2;$$

where b=k, and k is an arbitrary constant. The relationship between the gain coefficients "a" and "b" is important for balancing based on the error correcting signals (negative feedback signals) coming back into the summing amplifiers 202, 204, 210, 212, 218 and 220.

With reference still to FIG. 2, the internal wiring of the current sensing transducers 226 and 228 will now be described in detail. Current sensing transducer 226 includes two current transformers 291 and 292, and current sensing transducer 228 similarly includes two current transformers 293 and 294. The current transformers 291, 292, 293 and 294 are cascaded with the summing amplifiers 202, 204, 210, 212, 218 and 220 to form a low pass structure for active control of circulating current of the paralleled power amplifiers. The passive devices 230 and 232 may form a high pass structure for passive control of circulating current of the paralleled power amplifiers. As previously described, the outputs of the current transformers 291, 292, 293 and 294 may be amplified and integrated by respective pre-amplifiers 234, 236, 238 and 240, and provided as error correcting signals to the summing amplifiers 202, 204, 210, 212, 218 and 220 as illustrated.

The number of current sensing transducers required for the low pass structure is related to the number of power amplifiers (N) paralleled in the amplifier system, such that the number of transducers required equals (N−1). In the example amplifier system 200 of FIG. 2, the three paralleled power amplifiers (N=3) are each part of a full bridge configuration. Accordingly, there are two associated current transformers. Paralleled power amplifiers 206, 214 and 222 are associated with current transformers 291 and 292. Similarly, paralleled power amplifiers 208, 216 and 224 are associated with current transformers 293 and 294. With respect to the wiring, where "t" is the number of turns, the current transformers 291 and 293 may have 2 t windings in the primary, and It windings in the remaining windings, with the latter windings poled the same way. The current transformers 292 and 294 may have windings that are opposite to those of current transformers 291 and 293, as shown in FIG. 2. The resulting signals from the current transformers 291, 292, 293 and 294 represent a pair of difference equations. The difference equations may be the difference of the outputs of the power amplifiers 206, 214 and 222 and the difference of the outputs of the power amplifiers 208, 216 and 224.

The passive control system includes passive devices 230 and 232. Each of the passive devices 230 and 232 includes magnetic cores 295, 296, 297 and 298. The passive devices 230 and 232 may be inductors each formed with a small toroidal core shared by a plurality of windings. In the case of the passive control system, the geometry is not important, but just as in the current sensors 226 and 228 of the active control system, the numbers of windings and polings of the magnetic cores 295, 296, 297 and 298 is important. The number of windings is shown for each magnetic core 295, 296, 297 and 298 as either "M" or "2M" in FIG. 2. Where "M" is the number of turns taken on some common shared magnetic circuit. How the windings are poled and the relative number of flux lines that are generated is important. When the currents that flow through the windings of the passive devices 230 and 232 are matched, there will be no field in the magnetic cores 295, 296, 297 and 298 because the current will be in balance.

In summary, the low frequency active control system includes the current sensing transducers 226 and 228 to monitor imbalance to ensure low frequency variances of unbalanced current don't persist on the cores 295, 296, 297 and 298. The low pass active control system may have limited bandwidth, and therefore may not be capable of tracking rapid errors. As such, the active control system may allow rapid errors or short term errors that exist between the voltages found at the output of the different power amplifiers 206, 208, 214, 216, 222 and 224. The passive control system may control such rapid or short term errors due to the high pass structure. The passive devices 230 and 232 within the passive control system may be advantageously designed such that no net inductance is created in the output of the full bridge configurations. In addition, due to the active control of circulating current by the active control system, the passive devices 230 and 232 may be designed without excess volume of core material to avoid having any net flux stored in the cores 295, 296, 297 and 298. Accordingly, the cores 295, 296, 297 and 298 of the passive devices 230 and 232 maybe kept small thereby keeping costs relatively low.

As mentioned above, the same winding rules that apply to (N-1) magnetic cores 295, 296, 297 and 298 may be applied to the current sensing transducers 226 and 228 to produce the desired result. In this situation, the turns multiplier for all the current carrying windings may be an integer greater than 1. Each of the cores 295, 296, 297 and 298 may have one winding driven with reverse poling that has (N-1) times the turns as do any of the other windings. The windings of each core 295, 296, 297 and 298 may be seriesed with those of the next core(s) until each of the (N-1) power amplifiers has one core to represent the power amplifiers with a counter-poled winding. A passive master power amplifier will have no such core and will have passed through identical minimal windings in all (N-1) cores. Care should be used to keep the net resistance similar in all of the wiring including the so-called passive master power amplifier. Note that the power amplifier which is declared to be the master in the passive control system is not required to be the pseudo-master in the active control system.

Advantageously, the impedance of the passive control system may be created with simple inductors when the number of paralleled power amplifiers (N) is large. The impact on the net inductance output source impedance is diluted by (N) regardless of the impedance of the passive control system. For a small number of paralleled power amplifiers (N) such as 2 or 3, the added output inductance is more of a concern. In this case, core materials with a lower mu (M) value may be used in a simple inductor design to minimize the saturation effects. The case of large number of paralleled power amplifiers (N) may also dilute the need for this type of active balancing system as the noise of the power amplifiers simple active ballast feedback systems is reduced by the square root of the number of paralleled power amplifiers (N). Noise is thereby seen to be less improved by large number of paralleled power amplifiers (N) than is the output impedance for the simple inductor case.

Figure 3:
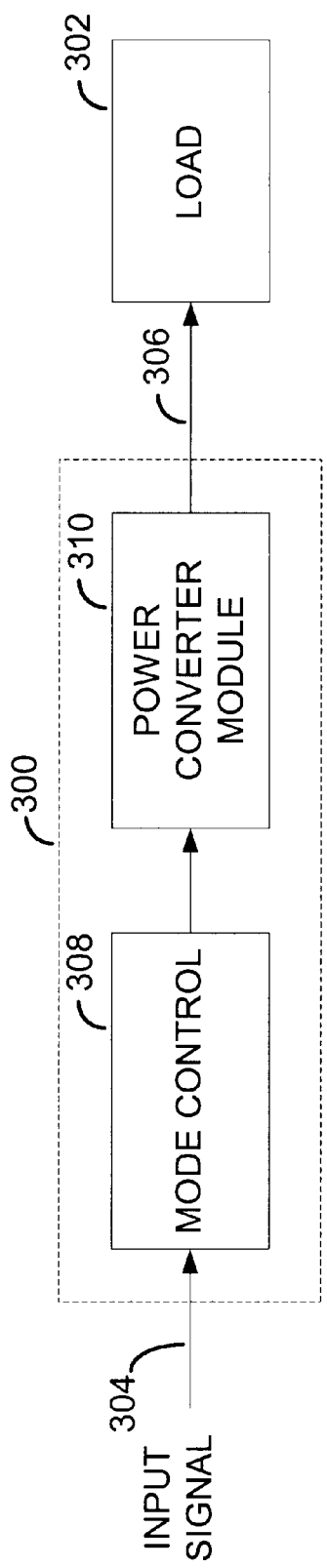
FIG. 3 is a block diagram of a power amplifier system and a load.

FIG. 3 illustrates a power amplifier system 300 coupled with a load 302. Input signals on at least one input signal line 304 may be amplified by the power amplifier system 300 and provided as output signals on at least one output signal line 306 to the load 302. The load 302 may be any load designed to receive amplified output signals from the power amplifier system 300, such as at least one loudspeaker, at least one gradient coil of an MRI device or any other device(s) capable of receiving amplified power. As used herein, the term "coupled", "connected", or "interconnected" may mean electrically coupled, optically coupled, wirelessly coupled, magnetically coupled and/or any other form of coupling providing an interface directly and/or indirectly between systems, devices and/or components.

The illustrated power amplifier system 300 includes a mode control 308 cooperatively operating with a power converter module 310 to provide the output signals to the load 302. Input signals may be supplied to the mode control 308, amplified by the power converter module 310 and supplied to the load 302. The power amplifier system 300 may operate in an audio system, an MRI system or any other type of system supplying a load 302 with amplified output signals.

The mode control 308 may be any mechanism or device capable of selecting between at least two operational modes of the power converter module 310, such as a parallel mono mode and a bridge mono mode. Selection of the mode may be based on the type of load 302, the electrical coupling between the power converter module 310 and the load 302 and/or the type of input signals provided to the mode control 308. In other systems, the mode control 308 may be omitted when the power converter module 310 supplies a single type of load 302 with a single type of input signal such as the power amplifier systems illustrated in FIGS. 1 and 2.

The power converter module 310 may be at least two half bridge amplifiers, at least one full bridge amplifier, multiple full bridge amplifiers (such as those illustrated in FIGS. 1 and 2) or any other form of switch-mode amplifier that includes multiple power amplifiers capable of operation in parallel. The power converter module 310 may operate as an opposed current amplifier (OCA) with interleaved modulation as described in U.S. Pat. No. 5,657,219 to Stanley, which is incorporated by reference. Alternatively, the power converter module 310 may operate with a topology similar to an opposed current amplifier that does not utilize interleaved modulation.

Figure 4:
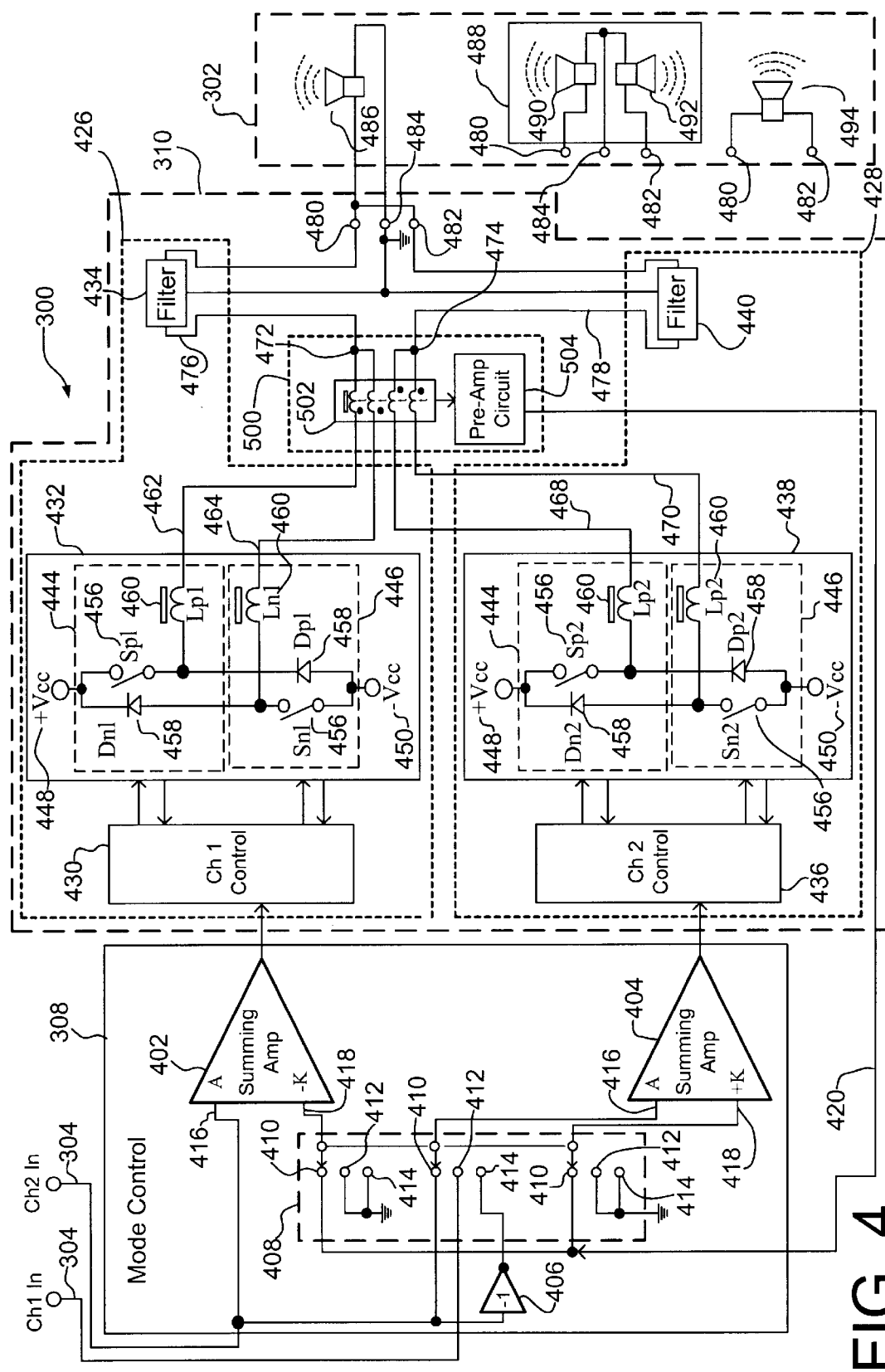
FIG. 4 is a schematic view of an example of 2 paralleled power amplifiers in the power amplifier system illustrated in FIG. 3.

FIG. 4 is an example of a more detailed block diagram of the power amplifier system 300 that includes the mode control 308 and the power converter module 310 coupled with a load 302. The illustrated mode control 308 includes summing amplifiers 402 and 404, an inverter 406 and a mode switch 408. The input signal lines 304 may provide any type of input signals such as a channel one input (CH1 IN) and a channel two input (CH2 IN) as illustrated. The channel one input may be coupled with the first summing amplifier 402, the inverter 406 and the mode switch 408. The channel two input may be coupled with the mode switch 408.

The mode switch 408 may be a three position switch as illustrated. Alternatively, the mode switch 408 may include fewer or greater numbers of switch positions to support different mode(s) for the input signal(s) and the load(s) 302. The three positions of the illustrated mode switch 408 are representative of a parallel mono mode in a first switch position 410, a stereo mode in a second switch position 412 and a bridge mono mode in a third switch position 414. Alternatively, for example, a two position switch representative of a parallel mono mode and a bridge mono mode, a parallel mono mode and a stereo mode or any other combination of the identified modes may be used. Still other alternatives include using the illustrated mode switch 408 in mono modes by coupling the channel one and channel two inputs together during the stereo mode of the second switch position 412.

In FIG. 4, the mode switch 408 is illustrated in the first position 410 which is the parallel mono mode. In the parallel mono mode, the channel one input signal is coupled to a first input 416 of the first and second summing amplifiers 402 and 404. In addition, a negative feedback signal on a negative feedback signal line 420 is coupled with a second input 418 of the first and second summing amplifiers 402 and 404. The negative feedback signal may be an error correcting signal representative of the previously discussed circulating current. The circulating current may be formed when the amplified power output signals of paralleled power amplifiers within the power converter module 310 are unbalanced. Accordingly, the negative feedback signal may be used to control circulating current by dynamically minimizing unbalanced operation of the paralleled power amplifiers.

The summing amplifiers 402 and 404 may operate in the previously discussed circulating current negative feedback control. The circulating current negative feedback control may be an active control that controls circulating current without net effect on the amplified output power of the power converter module 310. Net effect on the output power, and therefore the voltage to the load 302, is avoided by the "zero sum" nature of the circulating current negative feedback control. The "zero sum" nature in the example power converter module 310 involves controlling paralleled power amplifiers within the power converter module 310 equally and oppositely to balance the amplified power output of the paralleled power amplifiers. Since input signals are equally and oppositely adjusted by the summing amplifiers 402 and 404 to control the circulating current, there is no net effect on the output power of the power converter module 310.

The channel one input signal may be a mono signal that is provided to the first input 416 of both the summing amplifiers 402 and 404 during the parallel mono mode. The negative feedback signal is similarly provided to the second input 418 of both the first and second summing amplifiers 402 and 404. The first summing amplifier 402 may subtract the negative feedback signal from the channel one input signal and apply a gain coefficient as previously discussed. The second summing amplifier 404 may add the negative feedback signal to the channel one input signal and similarly apply a gain coefficient. The first and second summing amplifiers 402 and 404 may add and subtract, respectively, the negative feedback signal due to the zero sum nature of the negative feedback control. As such, adjustment of the circulating current may be performed without impacting the power output of the power amplifier system 300.

In the second switch position 412 representing the stereo mode, the first and second channels may be left and right stereo channels that are provided to the first input 416 of the first and second summing amplifiers 402 and 404. Alternatively, the first arid second channels may be one input signal (e.g., two channel mono) when the first and second channels are coupled and mono input signals are provided. In another alternative, two different input signals may be provided on the first and second channels. Whatever the source of the input signals on the first and second channels, power amplifiers within the power converter module 310 may operate as separate independent amplifiers each having an individual load 302 during the stereo mode. The second input to the first and second summing amplifiers 402 and 404 may be grounded since the negative feedback signal may be disregarded. The negative feedback signal may be disregarded when the output signals of the power amplifiers in the power converter module 310 are not paralleled in the stereo mode. Since the outputs are not paralleled, cancellation of the output current of the amplifiers to determine the circulating current does not occur.

In the bridge mono mode represented by the third switch position 414, the input signal on the first channel is provided to the first input 416 of the first summing amplifier 402. In addition, the input signal is inverted by the inverter 406 and provided to the first input 416 of the second summing amplifier 404. Similarly, the stereo mode, the second inputs 418 of the first and second summing amplifiers 402 and 404 may be grounded since the circulating current is not determinable based on cancellation of the output current of non-paralleled power amplifiers.

Referring still to FIG. 4, the illustrated power converter module 310 includes a first power amplifier 426 and a second power amplifier 428. As previously discussed, the power converter module 310 may include any number of power amplifiers. The illustrated first power amplifier 426 includes a first control circuit 430, a first output stage 432 and a first output filter 434. Similarly, the second power amplifier 428 includes a second control circuit 436, a second output stage 438 and a second output filter 440.

The control circuits 430 and 436 may be any circuit or device capable of driving the switch mode operation of the respective output stages 432 and 438, as a function of summed input signals provided from the respective summing amplifiers 402 and 404. Although not illustrated, the control circuits 430 and 436 may also drive the respective output stages as a function of feedback control, temperature control and other well-known control schemes. The output stages 432 and 438 may be any form of power handling output devices capable of high frequency switching of high voltage and/or high current, such as some form of semiconductor transistors. The illustrated output stages 432 and 438 may be opposed current amplifiers (OCAs) each operating in a half bridge configuration with interleaved modulation. Alternatively, the first and second output stages 432 and 438 may operate without interleaved modulation.

Each of the first and second output stages 432 and 438 include a positive output stage 444 and a negative output stage 446 supplied from a positive power rail (Vcc) 448 and a negative power rail (Vcc) 450. Each of the positive and negative output stages 444 and 446 includes a power switch 456 controlled by respective control circuits 430 and 436, a diode 458 for isolation of the power rails 448 and 450 and an inductor 460 for low pass filtering. During operation, the positive and negative output stages 444 and 446 of the first output stage 432 may generate positive and negative output stage power on a first positive stage signal line 462 and a first negative stage signal line 464, respectively. Similarly, the positive and negative output stages 444 and 446 of the second output stage 438 may generate positive and negative stage output power on a second positive stage signal line 468 and a second negative stage signal line 470, respectively. The positive and negative output stage power from each of the first and second output stages 432 and 438 may be summed at the respective first and second junction nodes 472 and 474 to form an amplified output signal on respective output signal lines 476 and 478.

The output filters 434 and 440 may be any filtering mechanism capable of operating as a low pass/ electromagnetic interference (EMI) filter to remove hi-frequency ripple, such as radio frequency noise. The amplified output signal of the first output stage 432 may be filtered by the first output filter 434 and provided by the first power amplifier 426 as a first amplified output signal on a first output terminal 480 of the power converter module 310. Similarly, the amplified output signal of the second output stage 438 may be filtered by the second output filter 440 and provided by the second power amplifier 428 as a second amplified output signal on a second output terminal 482. A common output terminal 484 may provide a ground reference for the output filters 434 and 440 and, depending on the mode, the load 302.

As previously discussed, the electrical coupling between the load 302 and the power converter module 310 may be different in the various modes selectable with the mode control 308. In the illustrated example, three loads 302 are depicted to represent the electrical coupling and load configuration for each of the parallel mono mode, the stereo mode and the bridge mono mode supported by the illustrated mode control 308. In other examples, fewer or greater numbers and types of loads (and corresponding modes) may be included.

A parallel mono load 486 for use with the parallel mono mode may be electrically coupled with the first output terminal 480 and the common output terminal 484 of the power converter module 310 as illustrated. In addition, the second output terminal 482 may be electrically coupled with the first output terminal 480 as illustrated to place the outputs of the first and second power amplifiers 426 and 428 (output stages 432 and 438) in parallel. Placing the outputs of the power amplifiers 426 and 428 in parallel may be performed by the mode control 308, manually or by any other mechanism. Although illustrated as a single loudspeaker, the parallel mono load 486 may be any number of loudspeakers or any other device(s) capable of receiving amplified output power.

A stereo load 488 may be electrically coupled with the power converter module 310 during the stereo mode. The stereo load 488 may include a first and second load 490 and 492 electrically coupled with the first and second output terminals 480 and 482, respectively, during the stereo mode. In addition, a common potential of the separate loads 490 and 492 may be electrically coupled with the common output terminal 484. Accordingly, the first and second power amplifiers 426 and 428 may independently provide amplified output power to the first and second loads 490 and 492, respectively.

A bridge mono load 494 may be electrically coupled with the power converter module 310 during the bridge mono mode. The bridge mono load 494 may be electrically coupled across the first output terminal 480 and the second output terminal 482 when in the bridge mono mode. As previously discussed, the amplified output power provided by the first and second power amplifiers 426 and 428 in the bridge mono mode may be the amplified channel one input signal and the inverted amplified channel one input signal.

The power converter module 310 also includes a circulating current sensing device 500 that is common to the first and second power amplifiers 426 and 428. In other examples, the circulating current sensing device 500 may be common to additional power amplifiers in the power converter module 310. Although not specifically illustrated in FIG. 4, the circulating current sensing device 500 may include at least two separate devices for use in controlling circulating current depending on the number of paralleled amplifiers (N) in the power converter module 310.

The first device(s) may be the previously discussed active control system that includes a current sensing transducer(s) and associated pre-amplifier(s) to sense a difference current representative of circulating current. The circulating current may be an error correcting signal used as negative feedback to control circulating current. The second device(s) may be the previously discussed passive device that decouples the outputs of the power amplifiers 426 and 428 from each other without adding inductance to the signal path of the amplified output power when the power amplifiers 426 and 428 are connected in parallel. The first and second devices may be separately wound or stacked and wound concurrently as previously described.

Alternatively, the passive device may be omitted where sufficient inductance exists in the wiring, etc. to decouple the outputs of the power amplifiers 426 and 428 and provide the previously discussed functionality of the passive control system. In this alternative, the circulating current sensing device 500 may be a current sensing transducer(s) as previously described to directly measure circulating current. The measured circulating current may be an error correcting signal utilized in a negative feedback control to actively minimize circulating current.

In another alternative, the current sensing function and the passive magnetic device function may be combined in at least one inductive current transformer 502 cooperatively operating with at least one pre-amplifier circuit 504 as illustrated. The inductive current transformer 502 may advantageously allow the paralleled amplified power outputs of the first and second power amplifiers 426 and 428 to remain decoupled (e.g. operate independently) without adding inductance to the signal path. In addition, the inductive current transformer 502 may sense the circulating current generated by the power amplifiers 426 and 428 by directly measuring differences in output current created when the power amplifiers 426 and 428 operate in parallel with unbalanced amplified power output signals. Sensed circulating current may be provided as a negative feedback signal by the preamplifier 504 to the circulating current feedback control loop to actively minimize circulating current.

The number of power amplifiers (N) in the power converter module 310 is related to the number of inductive current transformers 502 and associated pre-amplifier circuits 504 in the circulating current sensing device 500. Where there are (N) paralleled power amplifiers, there may be (N−1) inductive current transformers 502 and associated pre-amplifier circuits 504. In the example power converter module 310 illustrated in FIG. 4, first and second power amplifiers 426 and 428 may be paralleled (N=2), and therefore there is one inductive current transformer 502 and associated preamplifier circuit 504.

During operation in the parallel mono mode, circulating currents in the inductive current transformer 502 may be sensed when the first and second power amplifiers 426 and 428 are operating in parallel with unbalanced amplified power output signals. The sensed circulating currents may be amplified by the pre-amplifier circuit 504. The amplified sensed circulating current may be provided as the negative feedback signal (error correcting signal) on the negative feedback line 420.

Figure 5:
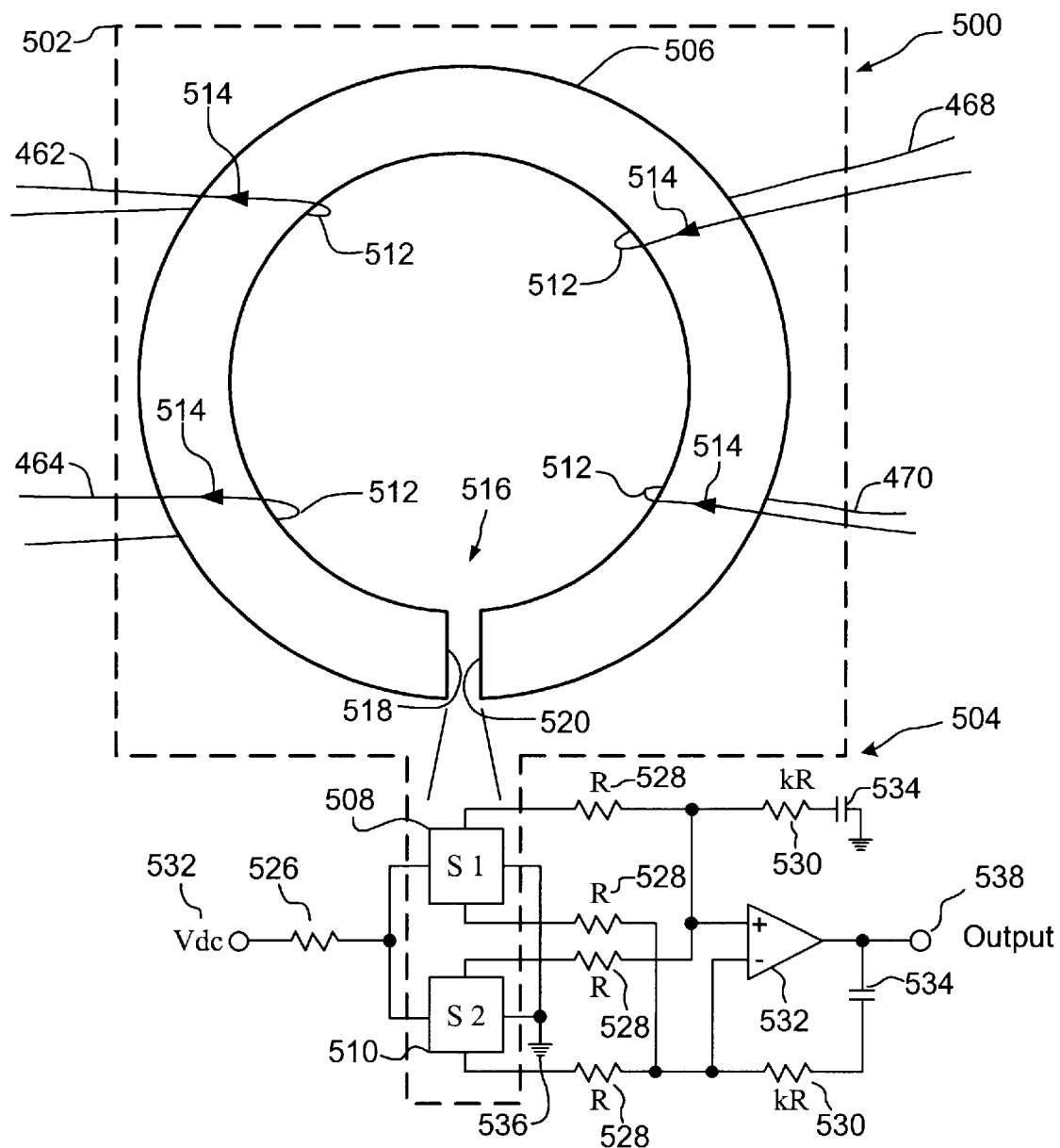
FIG. 5 is a schematic view of a circulating current sensing device illustrated in FIG. 4.

FIG. 5 is a more detailed circuit schematic of the circulating current sensing device 500 that includes the inductive current transformer 502 and the preamplifier circuit 504. The inductive current transformer 502 includes a passive magnetic device 506 and at least one sensor illustrated as sensors 508 and 510.

The passive magnetic device 506 may be a toroid core. The toroid core may be formed with any material, such as iron or steel, having high magnetic permeability that is capable of providing a high-permeance path for developed magnetic flux. The illustrated passive magnetic device 506 may be a powdered-iron core toroid. In addition, the passive magnetic device 506 may include inductance to decouple the outputs of the paralleled power amplifiers 426 and 428 (FIG. 4), and passively minimize unbalanced amplified output power of the paralleled power amplifiers.

Referring now to FIGS. 4 and 5, primary windings 512 may also be coupled with the inductive current transformer 502. The positive and negative stage signal lines 462, 464 and 468, 470 from the respective positive and negative output stages 444 and 446 may each be wound around the passive magnetic device 506 to form primary windings 512. Accordingly, the length of the output signal lines 476 and 478 between the junction nodes 472 and 474, the respective output filters 434 and 440 and the respective output terminals 480 and 482 may be made relatively short to avoid re-injection of radio frequency level noise in the amplified output power signals. Alternatively, each of the output signal lines 476 and 478 may be wound around the passive magnetic device 506 to form the primary windings 512.

The number of turns (t) in the primary windings 512 may be equal and poled oppositely for the first power amplifier 426 and the second power amplifier 428 since the number (N) of power amplifiers 426 and 428 is two. In the illustrated example, the primary windings 512 each include one winding (1 t) wound oppositely for each power amplifier as indicated by current flow arrows 514. As previously discussed, the poling of the windings and the relative number of flux lines generated may allow other winding configurations. In addition, no secondary windings may be included with the inductive current transformer 502. Secondary windings may be avoided when the magnetic flux produced by the difference in stage currents in the windings 512 is sensed directly by the sensors 508 and 510 as described later. The equal and oppositely wound windings 512 may result in no net magnetization and resulting magnetic flux when the amplified output power signals are balanced during paralleled operation of the first and second power amplifiers 426 and 428.

Similar to the previously discussed passive device, the passive magnetic device 506, provides a high pass structure to passively limit output signal imbalances of the paralleled power amplifiers. The amount of impedance in the passive magnetic device 506 is a function of the expected imbalance of the power amplifiers 426 and 428. Accordingly, the impedance of the passive device 506 may be advantageously minimized by minimizing imbalance in the amplified output power of the power amplifiers 426 and 428. The impedance of the passive device 506 may be minimized by decreasing the volume of core material, which has economic benefits as well as lowering the net magnetic flux stored in the core.

Minimizing the expected imbalance of the amplified output power may be achieved by minimizing the difference in voltage magnitude of the amplified output signals from the power amplifiers 426 and 428. In addition, minimization of the expected imbalance may be achieved by increasing active control of the circulating current. Increasing active control may be achieved by increasing the bandwidth of the circulating current feedback control supported with the negative feedback signal provided by the circulating current sensing device 500.

The inductive current transformer 502 may also include a slot 516 formed in the passive magnetic device 506 similar to the core of an open loop current transformer. The slot 516 may be cut through the passive magnetic device 506 to form a void in the otherwise continuous passive magnetic device 506. The width of the slot 516 is defined by a first face 518 and a second face 520 formed in the passive magnetic device 506. The slot 516 may be formed to accommodate at least one sensor, or more than one sensor 508 and 510 as illustrated.

The sensors 508 and 510 may be any device(s) for detecting a magnetic flux and providing signals indicative of current such as an open loop Hall sensor, a giant magneto resistive (GMR) type sensor, or any other type of flux sensor. The dimensions of the sensors 508 and 510 may be formed to fit within the void provided by the slot 516. In the example illustrated, two sensors 508 and 510 are utilized to improve the signal-to-noise ratio and reduce DC drift through averaging of the current indications of the individual sensors 508 and 510. Averaging reduces the error (noise) by the square root of the number of sensors deployed. Alternatively, one sensor or three or more sensors may be used.

Where Hall effect sensors are utilized, each of the sensors 508 and 510 may be formed of a material with relatively linear response to magnetic flux and relatively good temperature stability, such as gallium arsenide. Issues relating to signal-to-noise ratio and signal drift may be addressed with multiple sensors as previously discussed. A material such as indium antimony may also be used to form the sensors 508 and 510.

During operation as Hall effect sensors, each of the sensors 508 and 510 may emit a signal representative of a differential mode voltage across the respective sensors 508 and 510. The differential mode voltages may be developed by magnetic field(s) produced by the passive magnetic device 506 that are not cancelled by the oppositely wound windings 512. In other words, unbalance current flow from the first and second power amplifiers 426 and 428 during paralleled operation may create the magnetic field(s). The differential mode voltages may be received by the preamplifier 504 as input signals. Alternatively, the differential mode voltages may be provided directly as negative feedback signals when amplification and integration otherwise occurring in the circulating current sensing device 500 occurs within the summing amplifiers 402 and 404.

The preamplifier 504 may be any differential receiver type amplifier, such as, a multiple input port differential receiver when multiple sensors are used. Alternatively, the preamplifier 504 may be single input port differential receiver and a summer where two or more sensors are included with the inductive current transformer 502. The example preamplifier 504 illustrated in FIG. 5 includes a bias resistor 526, a plurality of summing resistors 528, a plurality of gain controlling resistors 530, an amplifier 532 and a plurality of capacitors 534 electrically coupled as illustrated. In this example, the summing resistors 528 may have equal resistance. In addition, the gain controlling resistors 530 may have equal resistance that is a multiple of the resistance of the summing resistors 528.

A cell voltage (Vdc) 532 may be applied through the bias resistor 526 across the sensors 508 and 510 to a ground connection 536. The cell voltage (Vdc) 532 may create a common mode voltage. The common mode voltage may be affected by the magnetic flux to develop the differential mode voltages across the sensors 508 and 510. The magnitude of the differential mode voltages may be based on the strength of the magnetic flux produced by the passive magnetic device 506 during unbalanced power output conditions.

Utilizing the summing resistors 528 and the gain controlling resistors 530, the common mode voltage may be ignored while the differential mode voltages may be detected, averaged, integrated and amplified by the preamplifier 504. Integration may be performed with the capacitors 534 in cooperative operation with the summing resistors 528 and the gain controlling resistors 530. Matching of the capacitive values of the capacitors 534 may be avoided when the common mode alternating current (AC) is negligible. Alternatively, the integration functionality (H(s)) may be provided with a separate integration circuit within the circulating current sensing device 500, or provided within the summing amplifiers 402 and 404. The average integrated amplified difference in the differential mode voltage is representative of the circulating current and may be provided on an output node 538 to the negative feedback line 420 of FIG. 4.

Figure 6:
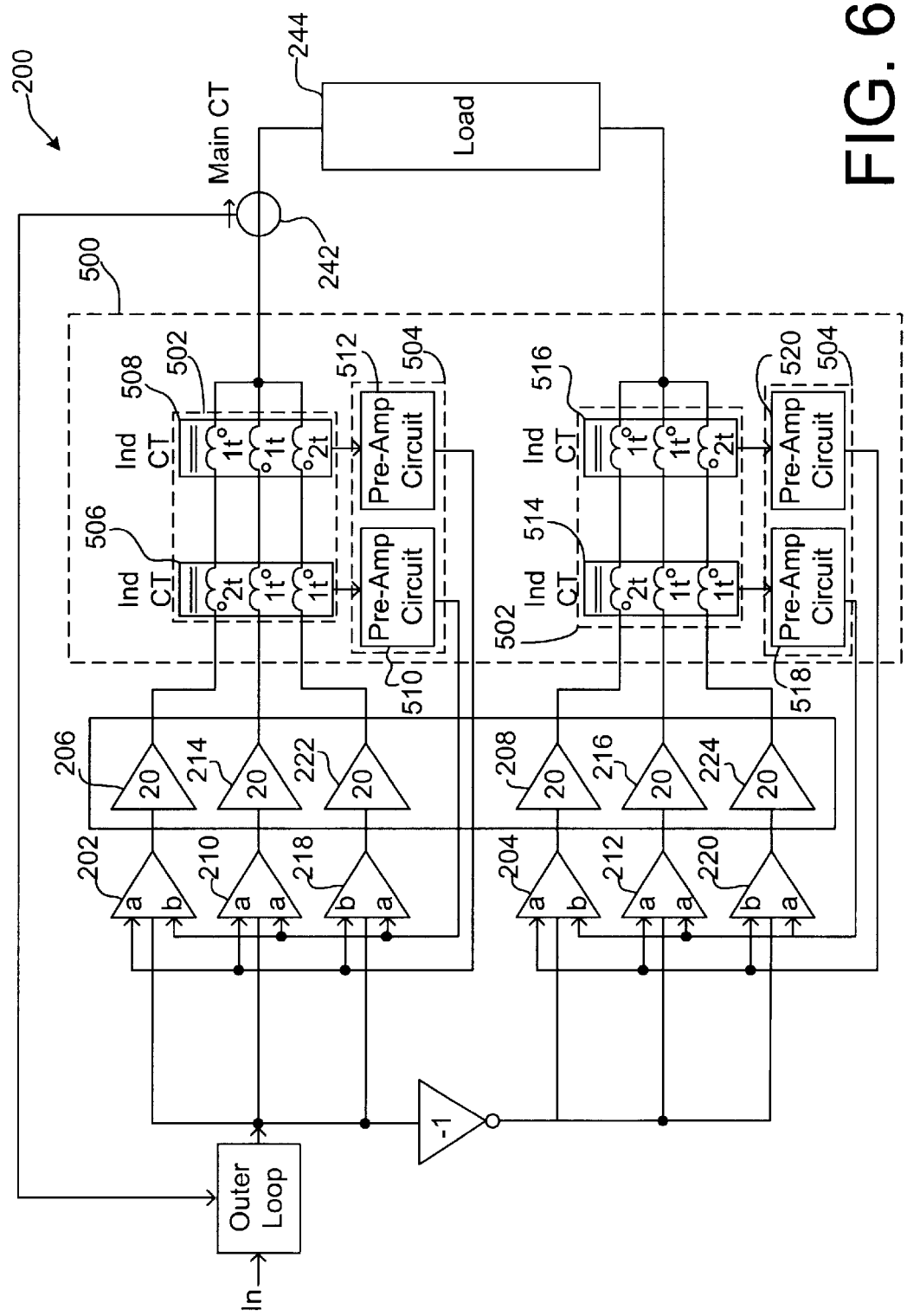
FIG. 6 is another example amplifier system configured similar to FIG. 2 with 3 paralleled power amplifiers.

FIG. 6 illustrates use of the circulating current sensing device 500 in the amplifier system 200 described with reference to FIG. 2. Similar to FIG. 2, the illustrated power amplifier system 200 includes the load 244, the summing amplifiers 202, 204, 210, 212, 218 and 220, the power amplifiers 206, 208, 214, 216, 222 and 224 within the three power modules and the main current transformer 242. As previously discussed, the illustrated amplifier system 200 includes three full bridge configurations that are fixed in a bridge mono mode with paralleled power amplifier output signals.

Since the outputs of the three (N) power amplifiers 206, 214, 222 are paralleled, two (N–1) inductive current transformers 506 and 508 and two pre-amplifier circuits 510 and 512 are included to detect difference current and provide the circulating current as a negative feedback signal. Similarly, two (N–1) inductive current transformers 514 and 516 and two pre-amplifier circuits 518 and 520 measure circulating currents created by the power amplifiers 208, 216, 224 with paralleled outputs.

Similar to FIG. 2, the windings of the example inductive current transformers 506, 508, 514 and 516 are configured with one primary winding wound twice (2 t) that is poled oppositely from the other two primary windings wound once (1 t). The cancellation of the magnetic flux created from the current of the amplified power output signals from each of the paralleled power amplifiers 206, 214 and 222 or 208, 216 and 224 results in circulating current indicative of unbalanced amplified power output signals. Since one primary winding has twice the windings (2 t), twice the magnetic flux is produced and may be cancelled by the oppositely poled 1 t windings. As such, circulating currents produced by paralleled output operation with an odd number of paralleled power amplifiers 206, 214 and 222 or 208, 216 and 224 may be sensed and utilized in the circulating current control.

In FIG. 6 the circulating current sensing device 500 is illustrated as positioned after the positive and negative output power signals have been combined (junction 472 and 474 in FIG. 4). Alternatively, the inductive current transformers 506, 508, 514 and 516 may positioned to measure the individual positive and negative output power signals from the positive and negative output stages (not shown) of each of the power amplifiers 206, 208, 214, 216, 222 and 224.

Figure 7:
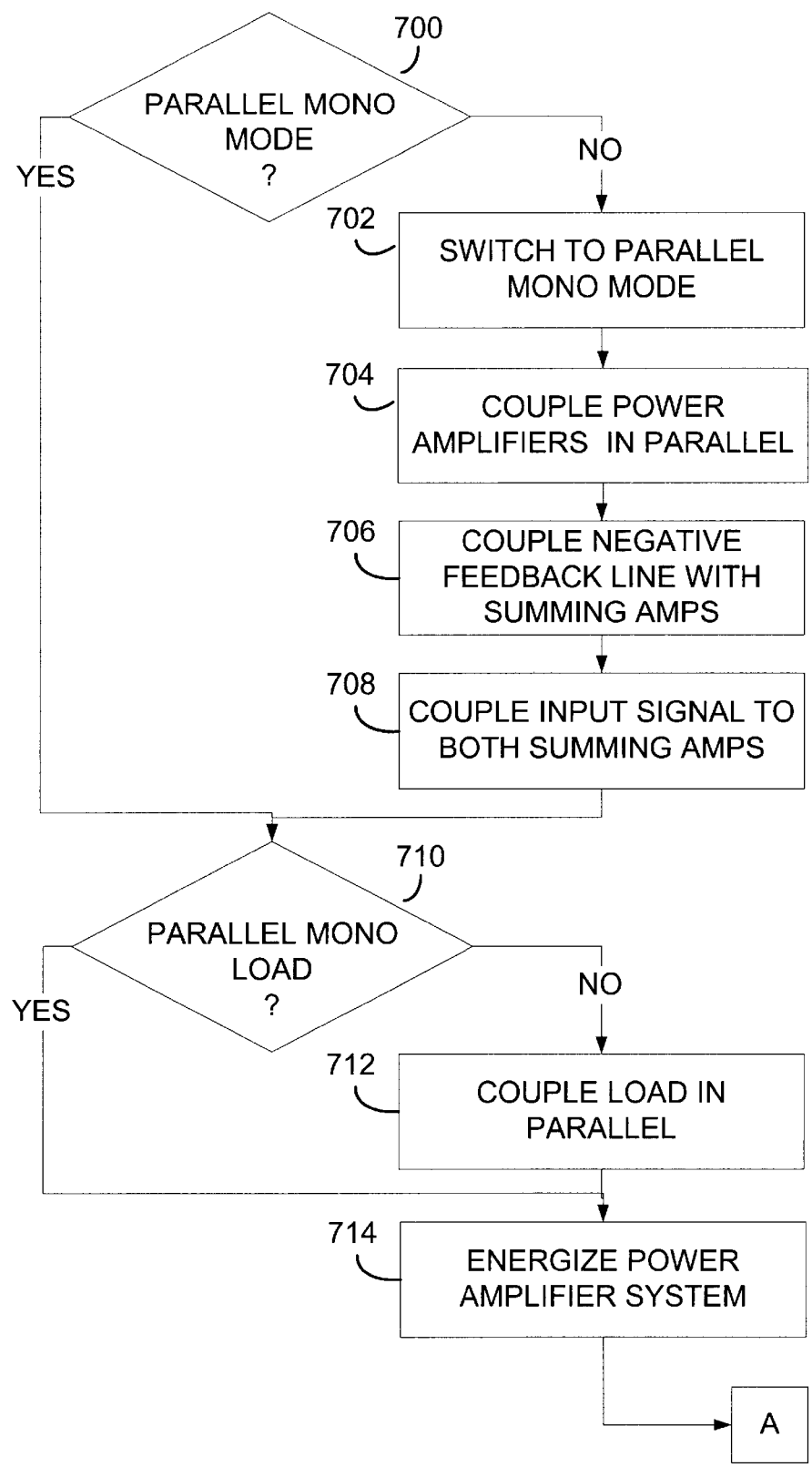
FIG. 7 is an example process flow diagram of the operation of the amplifier system illustrated in FIGS. 3, 4 and 5.

FIG. 7 is a process flow diagram illustrating operation of the power amplifier system 300 illustrated in FIGS. 3, 4 and 5 when paralleled operation of the first and second power amplifiers 426 and 428 in the parallel mono mode is desired. The operation begins at block 700 when it is determined if the power amplifier system 300 is in the parallel mono mode. If no, the mode switch 408 is switched to the parallel mono mode at block 702. At block 704, the first and second power amplifiers 426 and 428 are configured in parallel by coupling the first output terminal 480 and the second output terminal 482. In addition, at block 706, the negative feedback line 420 is electrically coupled with the second input 418 of both the first and second summing amplifiers 402 and 404. Further, at block 708, the channel one input signal on the input signal line 304 is coupled with the first input 416 of the summing amplifiers 402 and 404.

At block 710, it is determined if the load 302 is coupled to the power amplifier system 300 as the parallel mono load 486. If no, the load is coupled in parallel with the first output terminal 480 and the common output terminal 484 at block 712. At block 714, the power amplifier system 300 is energized. If, however, at block 710, the load 302 is the parallel mono load 486, the operation proceeds directly to block 714. Referring back to block 700, if the power amplifier system 300 is already in the parallel mono mode, the operation proceeds directly to block 710 to configure the load 302 and then energize the power amplifier system 300 at block 714.

Figure 8:
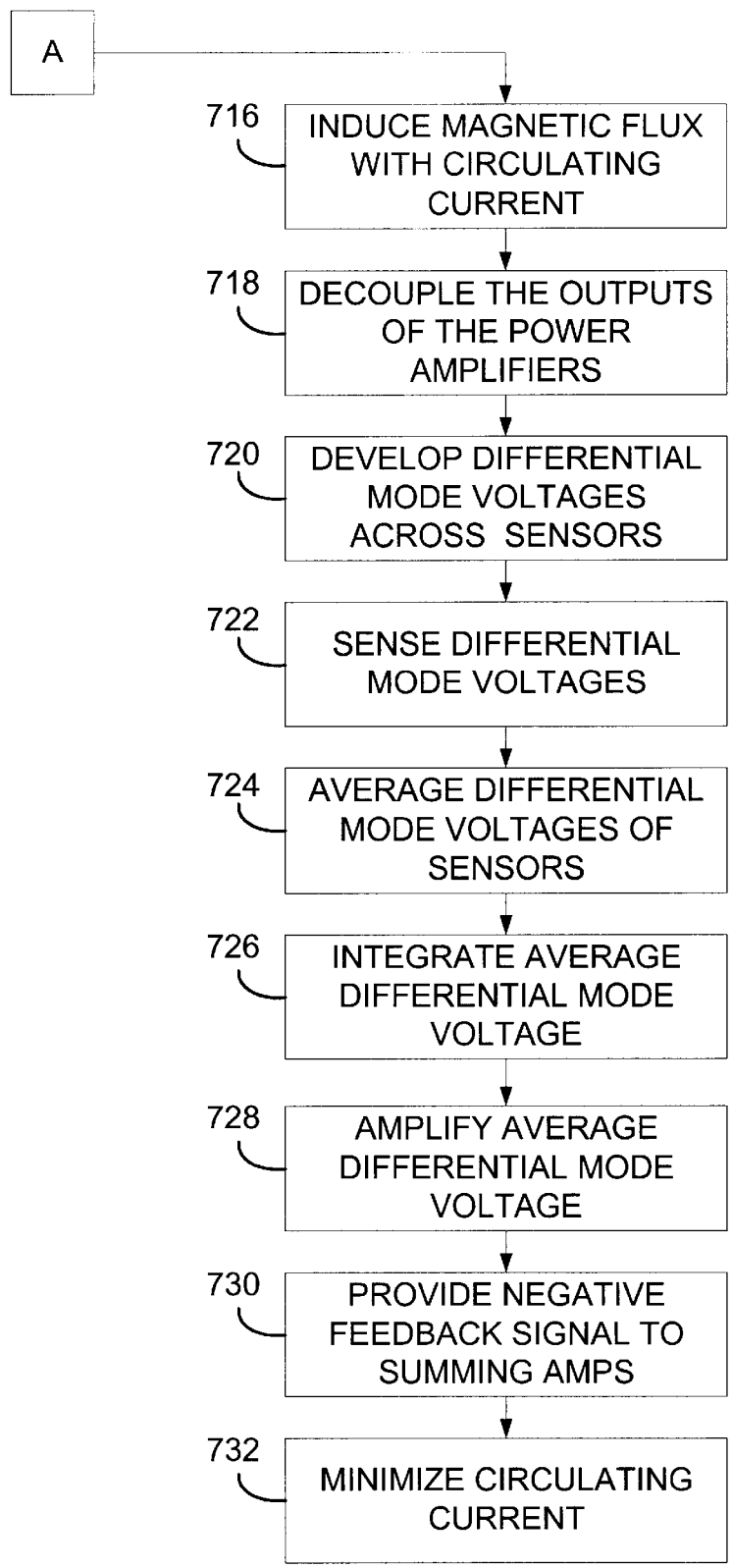
FIG. 8 is a second part of the example process flow diagram of FIG. 7.

The operation continues on FIG. 8 at block 716, where the difference in the output current of the first and second power amplifiers 426 and 428 induces a magnetic flux in the passive magnetic device 506. In addition, at block 718, the passive magnetic device 506, passively decouples the outputs of the power amplifiers 426 and 428 and passively limits unbalanced output voltages. The magnetic flux may develop the differential mode voltage supplied across the sensors 508 and 510 at block 720. At block 722, the pre-amplifier 504 senses the differential mode voltage and rejects the common mode voltage.

The differential mode voltages are detected from both the sensors 508 and 510 and averaged at block 724. At block 726, the averaged differential mode voltage is integrated. The averaged integrated differential mode voltage is amplified by the pre-amplifier 504 to create the negative feedback signal indicative of the circulating current at block 728. At block 730, the negative feedback signal is provided to the summing amplifiers 402 and 404 on the negative feedback line 420. The circulating current negative feedback control operates to actively minimize the circulating current with the "zero sum" concept based on the measured circulating current at block 732.

The previously discussed power amplifier systems provide lossless control of circulating current when power amplifiers included in the power amplifier system are operated in parallel. Control of circulating current is provided by a circulating current sensing device. The circulating current sensing device may be a single device that includes a preamplifier circuit and an inductive current transformer. The inductive current transformer may have sufficient inductance to passively control circulating current. In addition, the circulating current sensing device may utilize the pre-amplifier circuit and the inductive current transformer to actively sense circulating current. The circulating current may be provided as a negative feedback signal to a circulating current negative feedback control. The circulating current negative feedback control may actively minimize circulating current by making corrections to balance the output power of the paralleled power amplifiers without influencing the net output power of the power amplifier system.

While various embodiments of the invention have been described, it will be apparent to those of ordinary skill in the art that many more embodiments and implementations are possible that are within the scope of the invention. Accordingly, the invention is not to be restricted except in light of the attached claims and their equivalents.

What is claimed is:

1. A circulating current sensing device for a power amplifier system having power amplifiers capable of operation with paralleled outputs, the circulating current sensing device comprising:

an inductive current transformer that includes a passive magnetic device having a slot and a sensor disposed in the slot, wherein the sensor is operable to sense circulating current of the paralleled power amplifiers as a function of magnetic flux in the passive magnetic device; and a preamplifier circuit operable to process a signal received from the sensor to generate a negative feedback signal indicative of circulating current.

2. The circulating current sensing device of claim 1, where an output signal line from each of the paralleled power amplifiers is wound around the passive magnetic device.

3. The circulating current sensing device of claim 1, where the paralleled power amplifiers each include a positive stage and a negative stage with respective positive stage and negative stage signal lines, each of the positive and negative stage signal lines are wound around the passive magnetic device.

4. The circulating current sensing device of claim 1, where the passive device is operable to de-couple the outputs of paralleled power amplifiers and provide magnetic flux indicative of circulating current.

5. The circulating current sensing device of claim 1, where the sensor comprises gallium arsenide.

6. The circulating current sensing device of claim 1, where the sensor is operable to develop a differential mode voltage based on the magnetic flux, the differential mode voltage measurable across the sensor with the preamplifier.

7. The circulating current sensing device of claim 1, where the sensor comprises at least two sensors, the preamplifier operable to detect, average, integrate and amplify signals output from the at least two sensors.

8. The circulating current sensing device of claim 1, where the preamplifier is a differential receiver amplifier operable to detect a differential mode voltage of the sensor, the differential mode voltage indicative of circulating current.

9. A circulating current sensing device for sensing circulating currents in paralleled power amplifiers, the circulating current sensing device comprising:

means for decoupling the outputs of paralleled power amplifiers, where the means for decoupling is formed with a slot; and means for sensing circulating current of the paralleled power amplifiers, the means for sensing positioned within the slot to measure circulating current.

10. The circulating current sensing device of claim 9, where the means for sensing comprises means for detecting magnetic flux.

11. The circulating current sensing device of claim 9, where the means for sensing comprises means for detecting differential mode voltage, where the differential mode voltage is indicative of circulating current.

12. The circulating current sensing device of claim 9, where the means for decoupling the outputs is coupled with the outputs of the power amplifiers.

13. The circulating current sensing device of claim 9, where the means for decoupling the outputs includes a toroid core in which a magnetic flux may be induced by unbalanced amplified output power signals of the power amplifiers.

14. A power amplifier system that includes a plurality of power amplifiers capable of cooperative operation with outputs coupled in parallel, the power amplifier system comprising:

a plurality of power amplifiers capable of operation in parallel;

a passive magnetic device having a core that includes a slot, where the passive magnetic device is operable to de-couple the outputs of the paralleled power amplifiers; and a flux sensor positioned in the slot, wherein the flux sensor is operable to sense circulating current generated by unbalanced amplified output power of the power amplifiers during operation in parallel.

15. The power amplifier system of claim 14, where the flux sensor is a Hall effect sensor.

16. The power amplifier system of claim 14, where the flux sensor is operable to generate a signal indicative of circulating current in response to a magnetic field formed by the passive magnetic device.

17. The power amplifier system of claim 14, where at least two flux sensors are positioned in the slot, the output signals of the at least two sensors are averaged to improve signal-to-noise ratio and reduce drift.

18. The power amplifier system of claim 14, further comprising a preamplifier circuit operable to receive a signal indicative of circulating current from the flux sensor.

19. The power amplifier system of claim 14, where the sensed circulating current is useable in a negative feedback control circuit to regulate the circulating current to zero to minimize unbalanced amplified output power from the power amplifiers operated in parallel.

20. The power amplifier system of claim 19, where the negative feedback control system is operable to adjust the input signals to the paralleled power amplifiers equally and oppositely.

21. A power amplifier system that includes a plurality of power amplifiers capable of cooperative operation with outputs coupled in parallel, the power amplifier system complying:

a first and second power amplifier capable of cooperative operation while coupled in parallel, where the first and second power amplifier each include a positive output stage and a negative output stage that are each operable to produce output stage power, where output stage power from the respective output stages is summed to produce the output power of each of the first and second power amplifiers; and a circulating current sensing device operable to decouple paralleled outputs of the first and second power amplifiers and directly measure the difference in current output from the first and second power amplifiers, the difference in current output available as a negative feedback signal to control circulating current.

22. The power amplifier system of claim 21, where the circulating current sensing device includes an inductive current transformer and a pre-amplifier circuit.

23. The power amplifier system of claim 22, where the inductive current transformer includes a passive magnetic device with a slot and a Hall effect sensor positioned in the slot.

24. The power amplifier system of claim 21, where the first and second power amplifiers are each a half bridged power amplifier.

25. A power amplifier system comprising:
- a plurality of power amplifiers with outputs capable of connection in parallel, where each of the power amplifiers includes a control circuit, a positive output stage, a negative output stage and a filter,
- where the control circuit is operable to control stage output power of the positive and negative output stages, and the filter is operable to filter the stage output power;
- an inductive current transformer operable as a passive magnetic device and a flux sensing device to directly measure circulating current from the stage output power of each of the positive and negative output stages; and
- a preamplifier operable to provide a negative feedback signal as a function of the measured circulating currents, the negative feedback signal provided to each of the power amplifiers when the outputs of the power amplifiers are paralleled.

26. The power amplifier system of claim 25, further comprising a mode control, where the power amplifier system is switchable between at least two of a parallel mono mode, a stereo mode and a bridge mono mode.

27. The power amplifier system of claim 26, where the negative feedback signal is coupled with a ground connection when the power amplifier is operated in one of the stereo mode and the bridge mono mode.

28. The power amplifier system of claim 25, where the inductive current transformer is operable as a passive magnetic device to passively limit imbalances in output power of the paralleled power amplifiers.

29. The power amplifier system of claim 25, where the negative feedback signal is useable in a negative feedback circulating current control to actively minimize imbalances in output power of the paralleled power amplifiers without impacting the total amplified output power of the power amplifier system.

30. A power amplifier system comprising:
- a mode control operable to receive an input signal;
- a plurality of power amplifiers, where the mode control is operable to configure the power amplifiers as a function of the input signal and a load supplied by the power amplifiers,
- where the power amplifiers are configurable by the mode control in a parallel mono mode in which the outputs of the power amplifiers are paralleled; and
- a circulating current sensing device operable in the parallel mono mode to decouple the paralleled outputs and to provide a circulating current of the paralleled power amplifiers as negative feedback.

31. The power amplifier system of claim 30, where the modes of the mode control also include at least one of a bridge mono mode and a stereo mode.

32. The power amplifier system of claim 30, where the circulating current sensing device is operable as both a passive magnetic device and a flux sensor.

33. The power amplifier system of claim 30, where the circulating current sensing device includes a passive magnetic device with a slot and a Hall effect sensor positioned in the slot.

34. A method of controlling circulating currents in a power amplifier system that includes a plurality of power amplifiers capable of cooperative operation with outputs coupled in parallel, the method comprising:
- selecting a parallel mono mode of operation of a power amplifier;
- electrically connecting the outputs of at least two power amplifiers in parallel;
- passively balancing the output power of the at least two power amplifiers with a circulating current sensing device;
- measuring the difference in output current of the paralleled outputs with the circulating current sensing device; and
- actively balancing the output power of the at least two power amplifiers with negative feedback control as a function of the measured difference in output current.

35. The method of claim 34, where selecting a parallel mono mode of operation comprises changing the power amplifier from one of a stereo mode and a bridge mono mode to the parallel mono mode.

36. The method of claim 34, where selecting a parallel mono mode of operation comprises electrically coupling an output of the circulating current sensing device with at least two summing amplifiers that are also electrically connected with an input signal.

37. The method of claim 34, where electrically connecting the outputs comprises connecting a load between the paralleled output and a common output of the at least two power amplifiers.

38. The method of claim 34, where measuring the difference in output current comprises inducing a magnetic field in a core of the circulating current sensing device.

39. The method of claim 34, where measuring the difference in output current comprises measuring a differential mode voltage, the differential mode voltage generated by a magnetic field produced by the circulating current sensing device.

40. The method of claim 34, where measuring the difference in output current comprises sensing the difference in output current of the power amplifiers by sensing the difference in output current of a positive and negative stage output current of each of the power amplifiers.

41. The method of claim 34, where actively balancing the output power comprises adjusting equally and oppositely the input signal to each of power amplifiers with the negative feedback control to maintain the same total output power of the power amplifier system.

\* \* \* \* \*